United States Patent [19]

Tanaka

[11] Patent Number: 5,049,715
[45] Date of Patent: Sep. 17, 1991

[54] ELECTRIC DISCHARGE MACHINE

[75] Inventor: Hidehiko Tanaka, Nagoya City, Japan

[73] Assignee: Mitsubishi Denki Kabushiki Kaisha, Tokyo, Japan

[21] Appl. No.: 474,567

[22] Filed: Feb. 2, 1990

[30] Foreign Application Priority Data

Feb. 3, 1989 [JP] Japan ................ 1-25093

[51] Int. Cl.⁵ ................ B23H 1/00; B23H 7/26
[52] U.S. Cl. ................ 219/69.11; 219/69.15; 219/69.2
[58] Field of Search ........... 219/69.2, 69.15, 69.12, 219/68, 69.1, 69.11; 204/129.46, 204 M; 125/11.01

[56] References Cited

U.S. PATENT DOCUMENTS

| | | | |
|---|---|---|---|
| 3,122,628 | 2/1964 | Inoue | 219/69.2 |
| 3,398,253 | 8/1968 | Rye | 219/69.2 |
| 4,236,985 | 12/1980 | Grodzinsky et al. | 219/69.2 |
| 4,596,066 | 6/1986 | Inoue | 219/69.15 |
| 4,849,599 | 7/1989 | Kuromatsu | 219/69.2 |

FOREIGN PATENT DOCUMENTS 15630 5/1983 Japan .
342304 12/1959 Switzerland ........ 219/69.2

Primary Examiner—Geoffrey S. Evans
Attorney, Agent, or Firm—Sughrue, Mion, Zinn, Macpeak and Seas

[57] ABSTRACT

The machine has a rotary device for holding and rotating a workpiece to be processed, an electrode disposed to oppose the workpiece, an indexing device for holding the electrode and indexing the electrode at a predetermined angular pitch, a power supply device for applying a voltage between the workpiece and the electrode so as to cause the electric discharge therebetween, and a cutting device for cutting a portion of the electrode which has been used for the electric discharge and has been indexed by the indexing device to face the cutting device. The consumed portions of the electrode are successively indexed to the position where the cutting device is set so that the consumed portion of the electrode is successively cut without requiring the processing to be stopped.

13 Claims, 3 Drawing Sheets

ELECTRIC DISCHARGE MACHINE

BACKGROUND OF THE INVENTION

1. Field of the Invention

The present invention relates to an electric discharge machine for processing a workpiece by means of an electric discharge arc generated between an electrode and the workpiece.

2. Description of the Related Art

FIG. 4 shows the construction of a conventional electric discharge machine. A first rotary device 4 is disposed in a processing cell 1 filled with a processing solution 2. A workpiece 3 to be processed is attached to a rotary shaft 4a of the rotary device 4. On the other hand, a second rotary device 7 attached to the end of a spindle 8 is disposed above the processing cell 1. An electrode 5 is attached to a rotary shaft 7a of the rotary device 7. The electrode 5 is disposed to oppose the portion of the workpiece 3 to be processed, within the processing solution 2. A cutting jig 9 is disposed in the processing cell 1 through the intermediary of an insulation bed 10. The cutting tool 9 is electrically insulated from the processing cell 1 by the insulation bed 10.

In operation, the spindle 8 is moved horizontally so that the electrode 5 is moved closer to the portion of the workpiece 3 to be processed. In this state, the first and second rotary devices 4 and 7 are operated to cause the workpiece 3 and the electrode 5 to rotate about the axes of the rotary shafts 4a and 7a and a voltage is applied between the workpiece 3 and the electrode 5 by means of a power supply device (not shown) so as to cause an electrical discharge therebetween, whereby the workpiece 3 is processed into a shape corresponding to the shape of the electrode 5.

As shown in FIG. 5, the end of the electrode 5 is progressively consumed as a result of the electrical discharge. If the processing is continued, it becomes impossible to obtain the desired shape of the workpiece 3 because of excessive consumption D of the electrode 5. Therefore, the processing is temporarily stopped and the spindle 8 is moved towards the cutting tool 9. The cutting tool 9 then cuts the electrode 5 to recover the initial shape of the electrode 5. Subsequently, the spindle 8 is moved again towards the workpiece 3 and the processing by electrical discharge is again commenced. The cutting of the electrode 5 is conducted occasionally as required until one cycle of electrical discharge processing is completed.

Thus, the conventional electric discharge machine has suffered from a problem in that the processing efficiency is seriously impaired because the discharge has to be suspended to enable cutting of the electrode 5 which is worn during the processing by electric discharge.

SUMMARY OF THE INVENTION

Accordingly, an object of the present invention is to provide an electric discharge processing apparatus which provides a high processing efficiency thereby overcoming the above-described problems of the prior art.

To this end, according to the present invention, there is provided an electric discharge machine comprising: rotary means for holding and rotating a workpiece to be processed; an electrode disposed to oppose the workpiece; indexing means for holding the electrode and indexing the electrode at a predetermined angular pitch; power supply means for applying a voltage between the workpiece and the electrode so as to cause an electric discharge therebetween; and cutting means for cutting a portion of the electrode which has been used for the electric discharge and which has been indexed by the indexing means to face the cutting means.

DESCRIPTION OF THE PREFERRED EMBODIMENTS

An embodiment of the present invention will be described with reference to the accompanying drawings.

Figure 1:
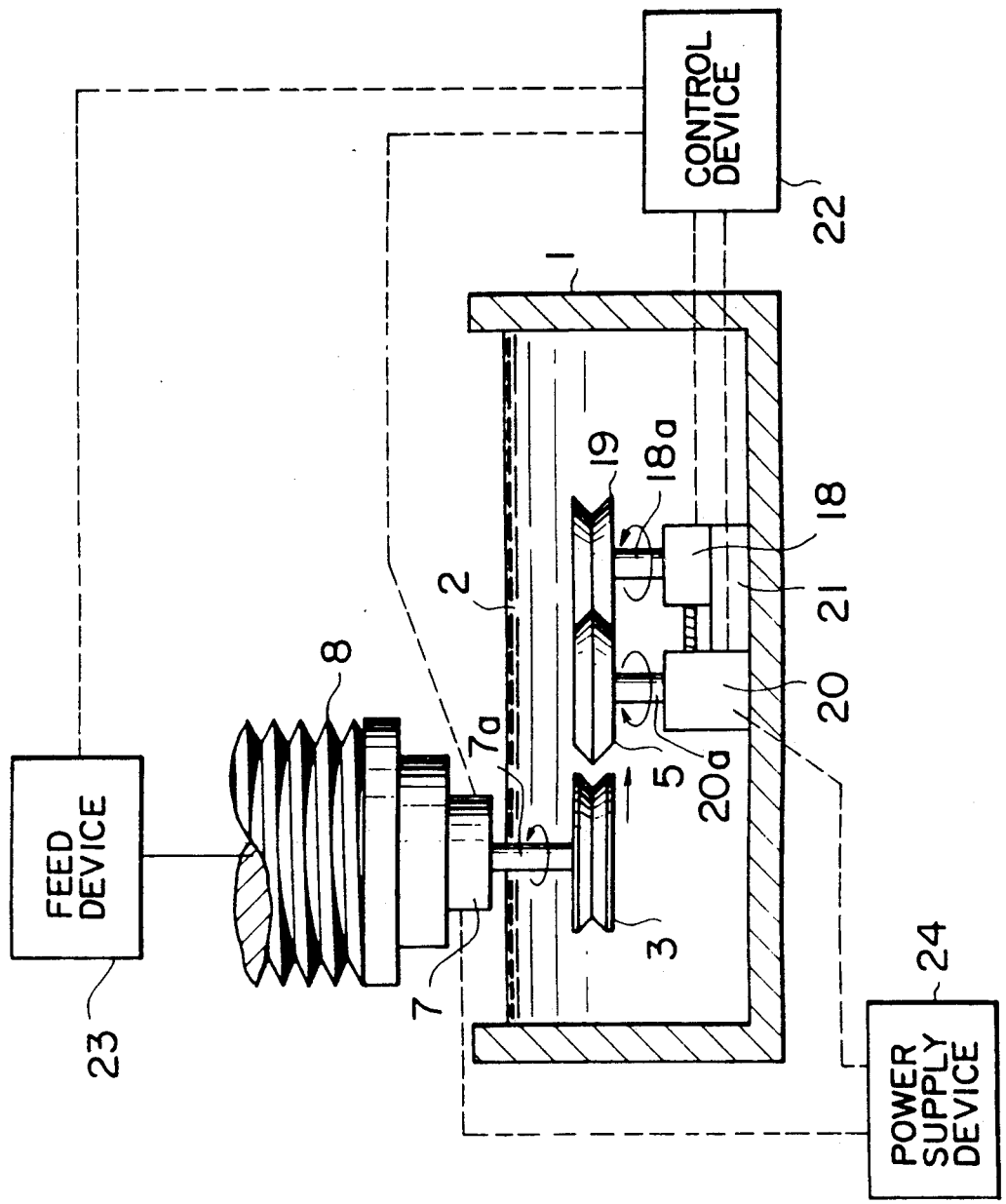
FIG. 1 is a sectional view of an embodiment of an electric discharge machine in accordance with the present invention.

Referring to FIG. 1, an indexing device 20 is disposed in a processing cell 1 filled with a processing solution 2. An electrode 5 is attached to a rotary shaft 20a of the indexing device 20. On the other hand, a rotary device 7 provided on the end of a spindle 8 is disposed above the processing cell 1. A workpiece 3 to be processed is attached to a rotary shaft 7a of the rotary device 7. The workpiece 3 is disposed to oppose the electrode 5 in the bath of the processing solution 2. A cutting device 18 is disposed in the processing cell 1 through the intermediary of an insulating base 21. A cutting jig 19 is attached to a rotary shaft 18a of the cutting device 18. The cutting device 18 is electrically insulated from the indexing device 20 by the insulating base 21.

The spindle 8 is attached to a feed device 23 which moves spindle 8 up and down and to the left and right. The cutting device 18 is designed so that it drives the rotary shaft 18a to rotate the cutting jig 19 and to feed the cutting jig 19 towards the electrode 5. The indexing device 20 is capable of driving its rotary shaft 20a so as to index the electrode 5 at a predetermined angular pitch. The rotary device 7, indexing device 20, cutting device 18 and the feed device 23 are connected to a control device 22 which controls the operations of the above-mentioned devices. A power supply device 24 is connected between the rotary device 7 and the indexing device 20. The power supply device 24 is capable of applying a voltage between the workpiece 3 and the electrode 5 through the respective rotary shafts 7a and 20a.

The operation of this embodiment is as follows. The feed device 23 is operated in accordance with an instruction given by the control device 22, such as to horizontally move the spindle 8 thereby to bring the portion of the workpiece 3 to be processed closer to the electrode 5. The workpiece 3 is rotated by the rotary device 7 about the axis of the rotary shaft 7a and, at the same time, a voltage is applied between the workpiece 3 and the electrode 5 by the power supply device 24 so as to cause electrical discharge to occur between the workpiece 3 and the electrode 5. In consequence, the workpiece 3 is processed into a shape corresponding to the shape of the electrode 5.

The electrical discharge processing is thus commenced. Meanwhile, the indexing device 20 indexes the electrode 5 at a predetermined pitch about the axis of the rotary shaft 20a in accordance with the instruction from the control device 22. When the electrode 5 has been indexed through 180°, the cutting device 18 operates in accordance with an instruction from the control device 22 so as to feed the cutting jig 19 towards and into contact with the electrode 5, while rotating the cutting tool 19 about the axis of the rotary shaft 18a.

Figure 2:
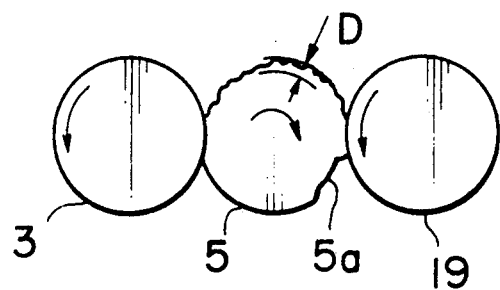
FIG. 2 is a schematic plan view of an essential portion of the embodiment shown in FIG. 1.

In consequence, as shown in FIG. 2, the portion of the electrode 5 used for the discharge in the beginning of the processing contacts the cutting jig 19 and is cut in an amount D which has been consumed after the start of the processing. Then, the portions of the electrode 5 used for the discharge are successively cut by the cutting jig 19, whereby a new electrode surface 5a is formed. Thus, the cutting of the consumed portion of the electrode 5 is conducted while the electric discharge processing is being executed.

Thus, the diameter of the electrode 5 is reduced in the amount corresponding to the amount of cutting when the electrode 5 has been indexed through 360° from the beginning of the processing. In this state, the control device 22 provides an instruction to the feed device 23 so that the latter operates to move the spindle 8 towards the electrode 5. In consequence, the workpiece 3 is set at the predetermined distance from the fresh electrode surface 5a of the electrode 5 and the electric discharge processing is continued in this state. This operation is repeated until the electric discharge processing of the workpiece 3 is completed.

Figure 3:
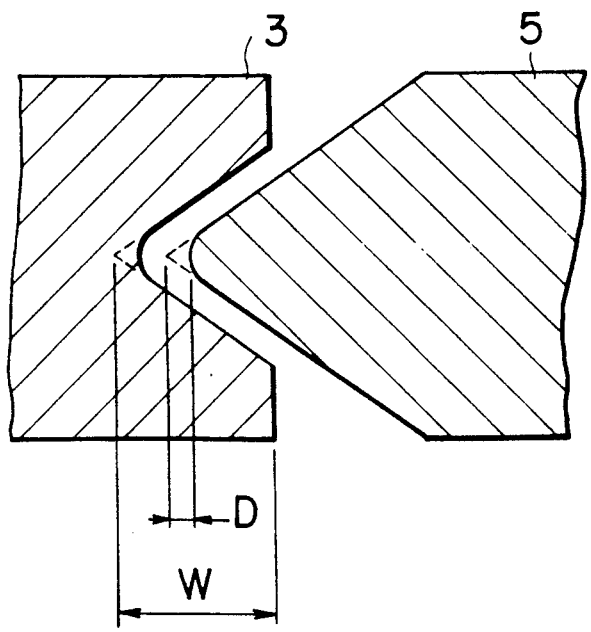
FIG. 3 is an illustration of the positional relationship between a workpiece and an electrode in the embodiment shown in FIG. 1.
Figure 4:
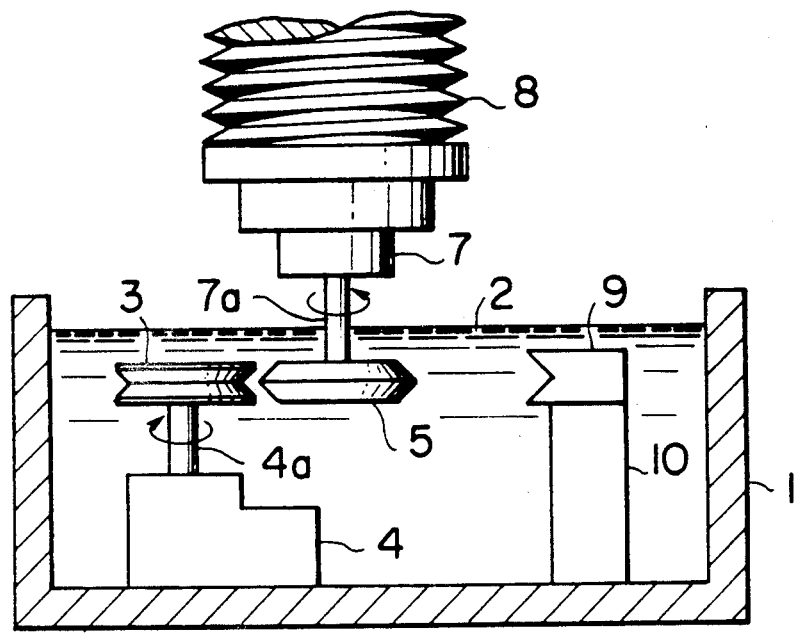
FIG. 4 is a sectional view of a conventional electric discharge machine.
Figure 5:
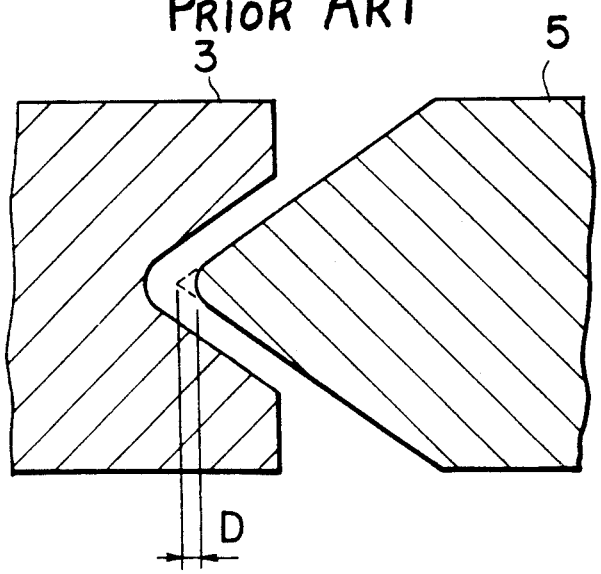
FIG. 5 is an illustration of the positional relationship between a workpiece and an electrode in the conventional electric discharge machine.

A test processing was conducted using the workpiece 3 and the electrode 5 of an equal diameter as shown in FIG. 3, under the processing conditions of a discharge peak current 10A, pulse duty period of 64 μs and a pulse off-duty period of 64 μs. Table 1 shows the relationship between the depth W of processing of the workpiece 3 and the amount D of consumption of the electrode 5.

TABLE 1

| W(mm) | D(mm) |
| --- | --- |
| 2.0 | 0.22 |
| 5.0 | 0.60 |
| 7.0 | 0.90 |
| 10.0 | 1.15 |

When the workpiece 3 and the electrode 5 have different diameters, the consumption amount D, i.e., the cutting amount, can be determined on the basis of the ratio between the peripheral lengths of the workpiece 3 and the electrode 5.

It is possible to use a numerical control device or other suitable devices as the control device 22 used in the present invention.

What is claimed is:

1. An electric discharge machine comprising:
    rotary means for holding and rotating a workpiece to be processed;
    an electrode disposed to oppose said workpiece;
    indexing means for holding said electrode and indexing said electrode at a predetermined angular pitch;
    power supply means for applying a voltage between said workpiece and said electrode to cause an electric discharge therebetween;
    cutting means for removing an outer portion of said electrode which has been used for said electric discharge and which has been indexed by said indexing means to face said cutting means, said cutting means being independently rotatable and being feedable in a direction toward said electrode; and
    feed means for feeding said rotary means and said workpiece in an up, down, left or right direction.

2. An electric discharge machine according to claim 1, further comprising control means to which said rotary means, said indexing means, said cutting means and said feed means are connected, said control means controlling the operations of said means connected thereto.

3. An electric discharge machine according to claim 1, wherein said electrode is generally circular.

4. An electric discharge machine according to claim 1, wherein said cutting means includes a cutting jig contactable with said electrode, and driving means for rotating said cutting jig and feeding said jig towards said electrode.

5. An electric discharge machine according to claim 1, further comprising a processing cell for receiving said workpiece, said electrode, said indexing means and said cutting means, and a processing solution filling said processing cell.

6. An electric discharge machine according to claim 1, wherein said workpiece and said cutting means are angularly displaced about said electrode such that discharge machining and electrode removal are implemented simultaneously at angularly spaced portions of the electrode.

7. An electric discharge machine comprising:
    rotary means for holding and rotating a workpiece to be processed;
    an electrode disposed to oppose said workpiece;
    indexing means for holding said electrode and indexing said electrode at a predetermined angular pitch;
    power supply means for applying a voltage between said workpiece and said electrode to cause an electric discharge therebetween; and
    cutting means for removing an outer portion of said electrode which has been used for said electric discharge and which has been indexed by said indexing means to face said cutting means, said cutting means being independently rotatable and being feedable in a direction toward said electrode, wherein said electrode is fixedly positioned to said indexing means and is not movable.

8. An electric discharge machine according to claim 7, further comprising feed means for feeding said rotary means and said workpiece in an up, down, left or right direction.

9. An electric discharge machine according to claim 8, further comprising control means to which said rotary means, said indexing means, said cutting means and said feed means are connected, said control means controlling the operations of said means connected thereto.

10. An electric discharge machine according to claim 7, wherein said cutting means includes a cutting jig contactable with said electrode, and driving means for rotating said cutting jig and feeding said jig towards said electrode.

11. An electric discharge machine according to claim 7, further comprising a processing cell for receiving said workpiece, said electrode, said indexing means and said cutting means, and a processing solution filling said processing cell.

12. An electric discharge machine according to claim 7, wherein said workpiece and said cutting means are angularly displaced about said electrode such that discharge machining and electrode removal are implemented simultaneously at angularly spaced portions of the electrode.

13. An electric discharge machine according to claim 7, wherein said electrode is generally circular.

* * * * *